United States Patent [19] [11] 4,452,384
Graber [45] Jun. 5, 1984

[54] FOLDABLE BICYCLE SUPPORT DEVICE

[76] Inventor: Joseph V. Graber, 3739 County Trunk M, Middleton, Wis. 53562

[21] Appl. No.: 501,617

[22] Filed: Jun. 6, 1983

[51] Int. Cl.³ ............................................. B60D 3/06
[52] U.S. Cl. ................................... 224/314; 224/309; 211/20; 211/21; 211/22
[58] Field of Search ............... 224/314, 309, 321, 325; 211/17, 20, 21, 22

[56] References Cited

U.S. PATENT DOCUMENTS 3,901,421  8/1975  Kalicki et al. ..................... 211/17 X
3,994,425 11/1976  Graber .............................. 211/17 X
4,015,718  4/1977  Bernard ............................. 211/20 X
4,039,106  8/1977  Graber .............................. 211/17 X
4,126,228 11/1978  Bala et al. ......................... 211/22 X
4,345,705  8/1982  Graber .............................. 211/17 X

FOREIGN PATENT DOCUMENTS 2383806 11/1978  France ................................. 224/309
8202017 12/1982  Netherlands ......................... 224/309

Primary Examiner—Steven M. Pollard
Attorney, Agent, or Firm—Vernon J. Pillote

[57] ABSTRACT

A foldable bicycle support device including an elongated channel for receiving the wheels of a bicycle, a mounting bracket attached to the channel, an elongated bicycle support member swingably mounted on the bracket for movement between a folded position alongside the channel and a raised bicycle support position. A latch releasably holds the bicycle support member in its raised position and the support member has a clamp at its upper end for engaging the frame of the bicycle to support the bicycle in the longitudinal medial plane of the channel.

11 Claims, 6 Drawing Figures

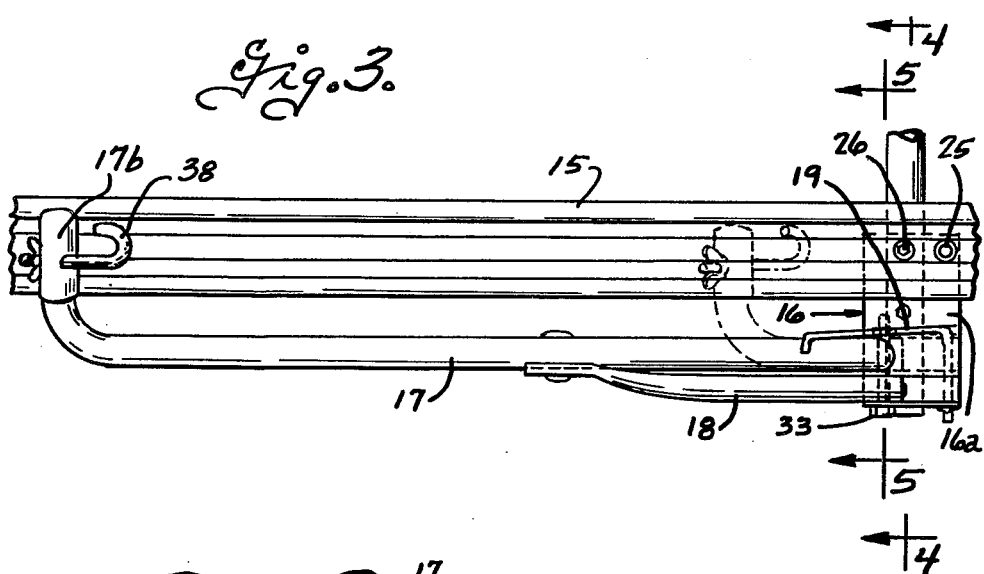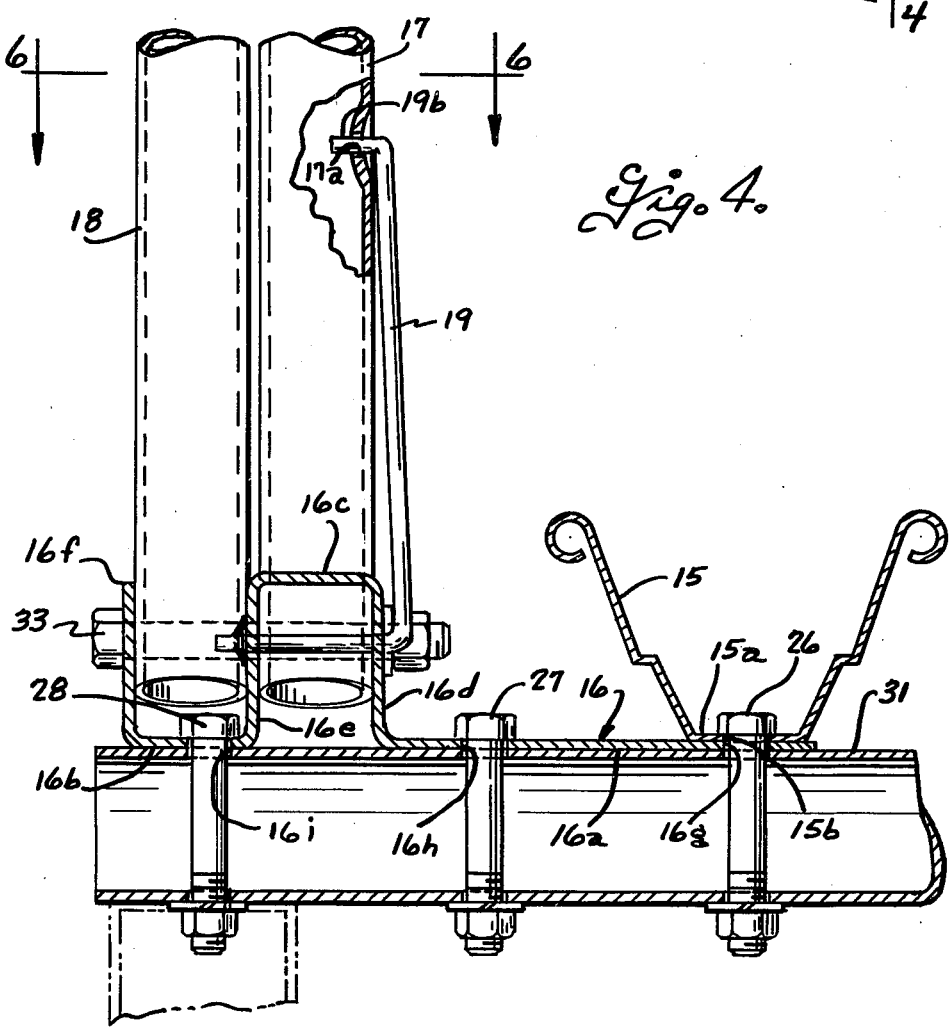

FOLDABLE BICYCLE SUPPORT DEVICE

BACKGROUND OF THE INVENTION

U.S. Pat. Nos. 3,901,421; 3,994,425; 4,039,106 and 4,345,705 disclose bicycle carriers adapted for mounting on the roof or deck lid of an automobile and which utilize a pair of upwardly opening channels mounted in relatively parallel relation on a pair of cross frame members for receiving the wheels of the bicycles, and an upwardly extending bicycle support frame mounted on the pair of cross frame members intermediate the channels for engaging and supporting a pair of bicycles resting in the two wheel receiving channels. In U.S. Pat. No. 4,345,705, the bicycle support frame is foldable to a level adjacent the wheel receiving channels to allow the vehicle to be driven into low overhead areas such as a garage, without requiring removal of the carrier from the vehicle.

The bicycle support frames in each of the above patents are mounted on the pair of cross frame members and each support frame is arranged to support a pair of bicycles. However, there are applications where a carrier for a single bicycle or for an odd number of bicycles is desired. Further, in the above carriers, the support frame is attached to the pair of cross frame members and the bicycle wheel receiving channels were independently attached to the cross frame members so that locating the support frame in proper relation to the wheel receiving channels required insertion of the fasteners through the proper holes in the cross frame members. The bicycle carriers are commonly shipped and sold in a disassembled condition to reduce the size of the shipping containers and the purchasers could become confused and assemble the support frame and/or wheel receiving channels in the wrong holes in the cross frame members.

SUMMARY OF THE INVENTION

It is an object of the present invention to provide a foldable bicycle support device which can be used alone to provide a single bicycle carrier, and which can be combined with other bicycle carriers of the same or different types, to provide a carrier for a plurality of bicycles.

Another object of this invention is to provide a foldable bicycle carrier that can be easily assembled and which assures that the foldable bicycle support frame is in proper relation to the wheel receiving channel.

Accordingly, the present invention provides a foldable bicycle support device of the type having an elongated upwardly opening channel member adapted to receive the wheels of a bicycle. A mounting bracket is attached to the channel member and has a generally flat base and first and second flange portions extending parallel to the channel member at locations spaced laterally from one side of the channel member, and an elongated support member has one end disposed between the first and second flange portions and a pivot pin extending through the first and second flange portions and through said one end of the bicycle support member to pivotally support the same for movement between a folded position extending alongside the channel member in a raised position in which the other bicycle support member is spaced above the channel member. A latch member engages the mounting bracket at a location spaced horizontally from the pivot pin and is engageable with the bicycle support member at a location spaced above the pivot pin when the support member is in its raised position to releasably retain the support member in its raised position. A means is provided on the other end of the bicycle support member for engaging a portion of the frame of the bicycle to support the bicycle in the longitudinal medial plane of the channel member.

The bicycle support member is advantageously laterally braced by a brace member that extends alongside the bicycle support member and which is pivotally supported at its lower end on the mounting bracket and which is attached at its other end to the bicycle support member. The mounting bracket is advantageously formed with a downwardly opening U-shaped intermediate section providing the first and second flange portions for pivotally mounting the bicycle support member, and the upper web portion of the U-shaped intermediate section is arranged to engage the bicycle support member when it is in its raised position to limit movement of the bicycle support member in one direction.

BRIEF DESCRIPTION OF THE DRAWINGS

FIG. 3 is a fragmentary horizontal sectional view showing the bicycle support device in a folded condition;

FIG. 4 is a fragmentary transverse sectional view taken on the plane 4—4 of FIG. 3 and illustrating the parts on a larger scale than FIG. 3;

Figure 1:
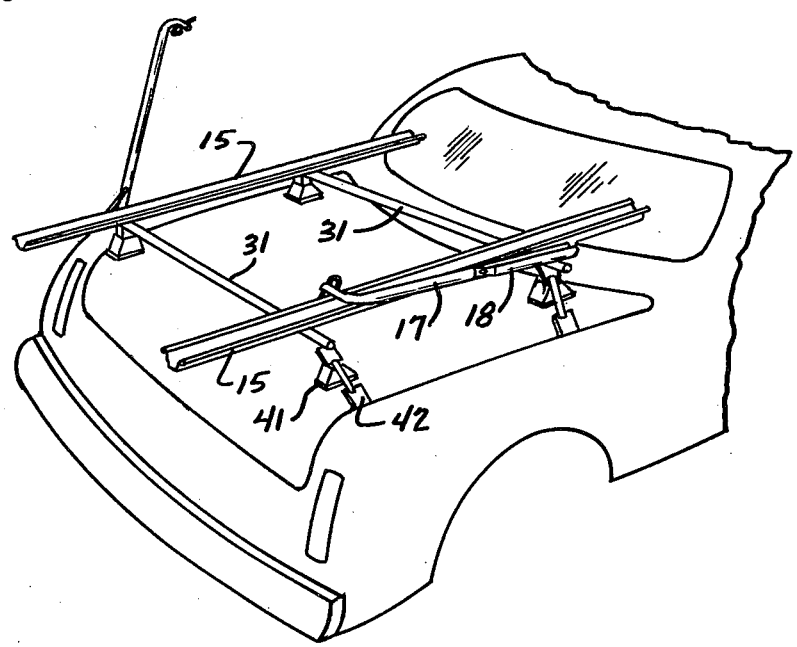
FIG. 1 is a perspective view of an automobile attached bicycle carrier shown mounted on the trunk deck of a vehcile, and utilizing the foldable bicycle support devices of the present invention.

The foldable bicycle support device in general includes an elongated channel member 15 adapted to receive the front and rear wheels W of a bicycle, a mounting bracket 16 attached to the wheel receiving channel, an elongated bicycle support member 17 pivotally mounted on the bracket 16 for movement between the folded position alongside the channel and a raised bicycle support position, for engaging the frame F of a bicycle and a latch member 19 attached to the mounting bracket and engageable with the bicycle support member when it is in its raised position, to hold the bicycle support member in its raised position. A brace member 18 is provided for laterally bracing the bicycle support member. The mounting bracket 16 is formed of one piece and includes first and second coplanar plate sections 16a and 16b and a downwardly opening U-shaped intermediate section having an upper web portion 16c and downwardly extending first and second flange portions 16d and 16e integrally joined to the adjacent edges of the plate sections 16a and 16b. A third upwardly extending flange portion 16f extends upwardly from the plate section 16b and is spaced from the flange portion 16e.

Figure 6:
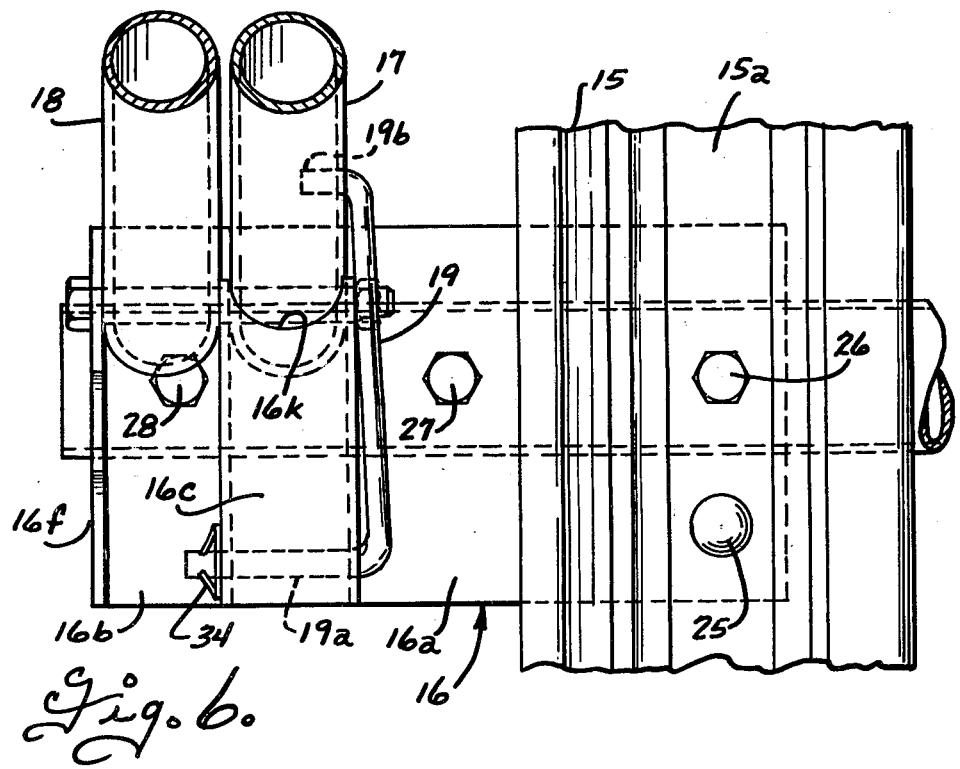
FIG. 6 is a fragmentary horizontal sectional view taken on the plane 6—6 of FIG. 4.

The plate section 16a of the mounting bracket is rigidly attached to the wheel receiving channel 15 with the flange portions extending parallel to the channel member at locations laterally spaced to one side of the channel member. As best shown in FIGS. 3 and 6, the plate section 16a is attached by a rivet 25 to the bottom wall 15a of the channel 15. Fastener receiving openings designated 16g and 16h are provided in the plate section 16a and a fastener receiving opening 16i is provided in the plate section 16b to receive fateners 26, 27, and 28 such as bolts, for attaching the mounting bracket to a support base such as a cross frame member 31. One of the fastener receiving openings 16g in the plate section 16a is located below the bottom wall 15a of the channel member and the channel member is provided with an opening 15b aligned with the opening 16g so that the fastener 26 also functions to secure the channel member and mounting bracket to the cross frame member 31. Thus, the rivet 25 and fatener 26 secure the plate section 16a of the mounting bracket to the channel member at spaced locations along the channel member so that the channel member inhibits tilting of the mounting bracket in a direction lengthwise of the channel member.

The lower end of the bicycle support member 17 is disposed between the first and second flange portions 16d and 16e of the mounting bracket and the lower end of the brace member 18 is disposed between the flange portions 16e and 16f. A pivot pin, herein shown in the form of a bolt 33 extends through alinged openings in the flange portion and through openings in the lower ends of the bicycle support members 17 and brace member 18 to pivotally support the latter for swinging movement between a lower position extending alongside the channel member, and a raised bicycle support position extending upwardly from the channel member. The web portion 16c of the intermediate section of the mounting bracket is notched or recessed as shown at 16k in FIG. 6 to engage the bicycle support member 17 when the latter is in its raised position, and to limit swinging movement in one direction. The latch 19 has a first laterally extending portion 19a at one end that extends through aligned openings in the flange portions 16d and 16e of the mounting bracket, at a location spaced horizontally from the pivot pin 33, to support the latch member for swinging movement on the mounting bracket. A retainer 34 is provided on the end of the lateral portion 19a of the latch member, to retain the same against withdrawal from the openings in the flange portions of the mounting bracket. The other end of the latch member 19 has a second laterally extending portion 19b arranged to extend into an opening 17a in the bicycle support member, when the bicycle support member is in its raised position. The opening 17a is spaced from the pivot axis of the bicycle support member and the latch member 19 is laterally resilient and is formed so as to normally bias the portion 19b into the opening 17a when the lateral portion 19b is aligned with the opening. The latch member is yieldable laterally to allow the portion 19b to be withdrawn from the opening 17a, so that the bicycle support arm can be moved to its lower or folded position. The upper end of the bicycle support arm has a lateral portion 17b adapted to overlie the channel at a location to engage a portion of a bicycle frame, and a retainer such as a hook member 38 is adjustably mounted on the lateral portion 17b of the bicycle support member, for clamping the bicycle frame to the support member. The upper end of the brace member 18 is rigidly secured as by a rivet 30 to the bicycle support member 17 intermediate the ends of the latter.

Figure 2:
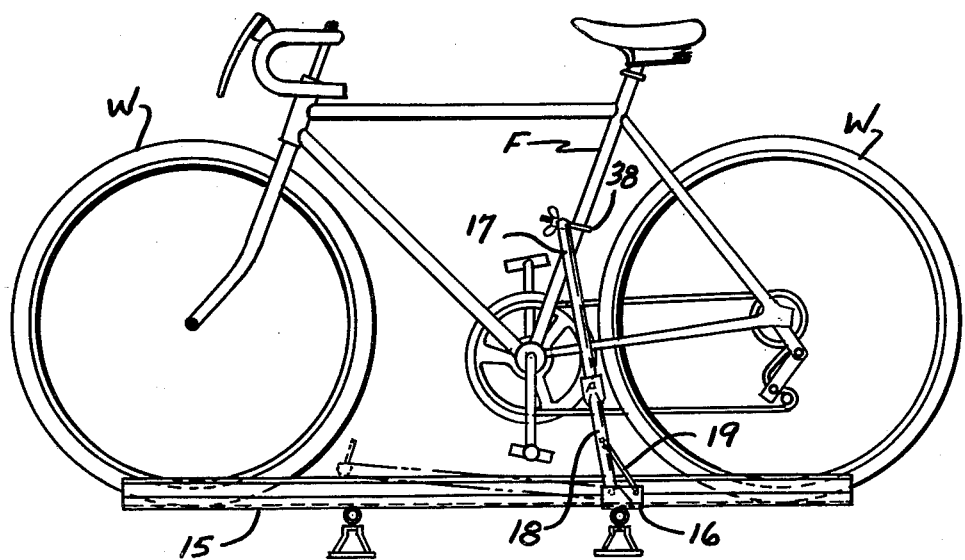
FIG. 2 is a side elevational view of a bicycle carrier utilizing the foldable bicycle support device.
Figure 5:
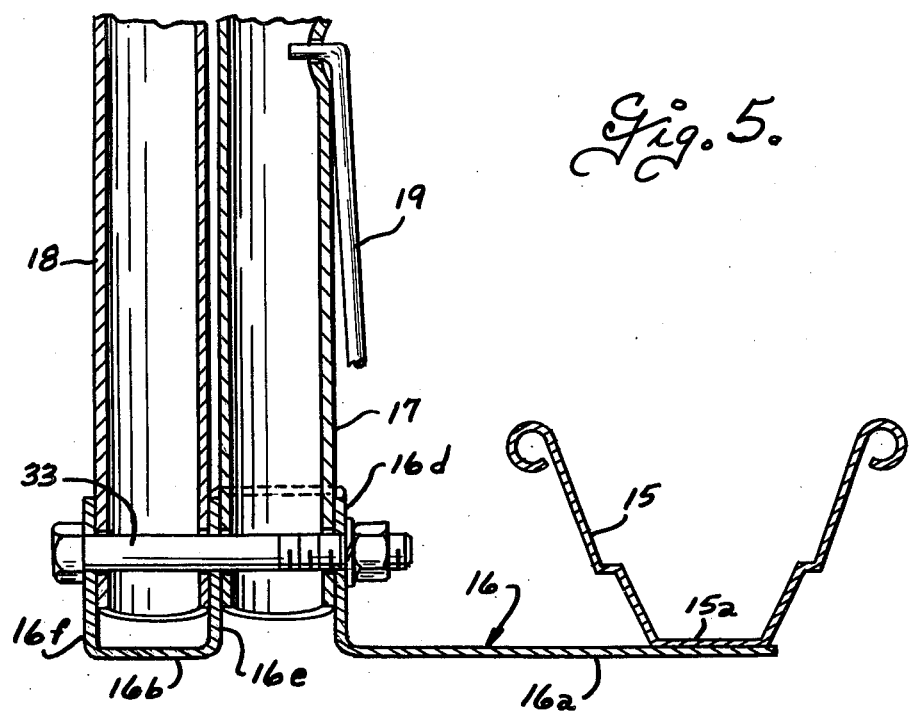
FIG. 5 is a fragmentary vertical sectional view taken on the plane 5—5 of FIG. 3 and illustrating the parts on a larger scale than FIG. 3.

The bicycle support device can be mounted on various different bases to provide a foldable bicycle support. In the embodiment shown, the bicycle support device is mounted on a cross frame member 31 that is supported as by vehicle engaging feet 41 and straps 42 on a vehicle, to provide an automobile bicycle carrier. The mounting brackets support one end of the wheel receiving channel 15 and the bicycle support arm and latch member in proper relation to each other so that it is only necessary to fasten the mounting bracket to the support base using fasteners 26–28. The other end of the wheel receiving channel can be mounted on a second cross frame member, as shown in FIGS. 1 and 2. The foldable bicycle support devices can be used alone to provide a bicycle carrier for a single bicycle, or can be used in multiples as shown in FIG. 1 to provide a carrier for two or more bicycles. The foldable bicycle support device can also be mounted on the cross frame members of other bicycle carriers such as bicycle carriers shown in U.S. Pat. No. 4,345,705 to adapt the carrier in that patent for carrying an odd number of bicycles such as three or five. The foldable bicycle support device can also be mounted on conventional utility roof racks to provide a bicycle carrier along one side of the rack while allowing the remainder of the rack to be used carry cargo. The foldable bicycle support devices can also be bolted to a trailer bed to allow transporting of a large number of bicycles, or to a flat surface such as a floor or the like to provide a foldable bicycle display rack.

From the foregoing it is thought that the construction and use of the device will be readily understood. The bicycle support arm 17 can be moved from a folded position extending alongside the wheel receiving channel 15 to a raised bicycle support position as shown in solid lines in FIG. 2. When the bicycle support member 17 is in its raised position, it engages a stop face 16k on the web portion 16c of the mounting bracket and the upper lateral portion 19b of the latch member is positioned to extend into the opening 17a to hold the support arm in its raised position. The frame F of the bicycle is clamped to the upper end of the support arm by the hook member 38 to support the bicycle in the longitudinal medial plane of the channel. The brace member 18 braces the bicycle support member in a direction laterally of the wheel receiving channel. The plate section 16a of the mounting bracket is attached to the channel at spaced locations by the rivet 25 and fastener 26, so that the mounting bracket is held against tilting movement relative to the channel in a direction lengthwise of the channel. Since the support arm and channel are interconnected by the mounting bracket, proper location of the support arm relative to the channel during installation of the mounting device is assured.

The embodiments of the invention in which an exclusive property or privilege is claimed are defined as follows:

1. A foldable bicycle support device comprising, an elongated upwardly opening channel member adapted to receive the wheels of a bicycle, a mounting bracket attached to said channel member and having a generally flat base and first and second flange portions extending parallel to said channel member at locations spaced laterally from one side of the channel member, an elongated bicycle support member having one end disposed between the first and second flange portions, a pivot pin extending through the first and second flange portions and through said one end of said bicycle support member and pivotally supporting the same for movement between a folded position extending alongside the channel member and a raised position in which the other end of the bicycle support member is spaced above the channel member, a latch member engaging said mounting bracket at a location spaced horizontally from the pivot pin and engageable with the bicycle support member at a location spaced above the pivot pin when the support member is in its raised position for releasably retaining the support member in its raised position, and means on the other end of the bicycle support member for engaging a portion of the frame of a bicycle to support a bicycle in the longitudinal medial plane of the channel member.

2. A foldable bicycle support device according to claim 1 wherein the mounting bracket has a third flange portion extending parallel to said second flange portion, a brace member having one end disposed between the second and third flange portions, said pivot pin extending through one end of the brace member and through said third flange portion to pivotally support the brace member, and means rigidly securing the other end of the brace member to the bicycle support member at a location spaced from the pivot pin.

3. A foldable bicycle support device comprising, an elongated upwardly opening channel member adapted to receive the wheels of a bicycle, a one-piece mounting bracket including first and second plate sections disposed coplanar with each other and having adjacent edges spaced apart and an intermediate downwardly opening U-shaped section having an upper web portion and first and second depending flange portions integrally joined along their lower edges to the adjacent edges of the respective first and second plate sections, means attaching the channel member to the first plate section with the length of the channel member extending generally parallel to the flange portions of the U-shaped section of the bracket, an elongated bicycle support member having one end disposed between the first and second flange portions of the U-shaped section of the bracket and through said one end of the elongated bicycle support member for pivotally supporting the latter for movement between a folded position extending alongside the channel member and a raised position in which the other end of the bicycle support member is spaced above the channel member, a latch member engaging the bracket at a location spaced horizontally from said pivot means and engageable with said bicycle support member at a location spaced above said pivot means when the support member is in a raised position for releasably retaining the support member in its raised position, and means on the other end of the bicycle support member for engaging a portion of the frame of a bicycle to support a bicycle in the longitudinal medial plane of the channel member.

4. A foldable bicycle support device according to claim 3 wherein the web portion of the U-shaped section of the bracket engages the bicycle support member when it is in its raised position to stop pivotal movement of the bicycle support in one direction.

5. A foldable bicycle support device according to claim 3 wherein the unitary bracket includes a third flange portion extending upwardly from the second plate section and generally paralleling the second flange portion of the U-shaped section of the bracket, an elongated brace member having one end attached to the bicycle support member at a location spaced from the pivot means and the other end disposed between said second and third flange portions and mounted on said pivot means for pivotal movement with the bicycle support member.

6. A foldable bicycle support device according to claim 3 wherein the flange portions of the U-shaped section of the bracket have aligned openings spaced from the pivot means and the support member has an opening in its side spaced from the pivot means, the latch member having a first lateral portion at one end pivotally received in the aligned openings in the flange portions of the U-shaped section, the latch member having a second lateral portion at its other end adapted to be received in the opening in the side of the support member.

7. A foldable bicycle support device according to claim 6 wherein the web portion of the U-shaped section of the bracket engages the bicycle support member when it is in its raised position to stop pivotal movement of the bicycle support in one direction.

8. A foldable bicycle support device according to claim 7 wherein the unitary bracket includes a third flange portion extending upwardly from the second plate section and generally paralleling the second flange portion of the U-shaped section of the bracket, an elongated brace member having one end attached to the bicycle support member at a location spaced from the pivot means and the other end disposed between said second and third flange portions and mounted on said pivot means for pivotal movement with the bicycle support member.

9. A foldable bicycle support device according to claim 6 wherein the unitary bracket includes a third flange portion extending upwardly from the second plate section and generally paralleling the second flange portion of the U-shaped section o the bracket, an elongated brace member having one end attached to the bicycle support member at a location spaced from the pivot means and the other end disposed between said second and third flange portions, and mounted on said pivot means for pivotal movement with the bicycle support member.

10. A foldable bicycle support device according to claim 3 wherein the unitary bracket includes a third flange portion extending upwardly from the second plate section and generally paralleling the second flange portion of the U-shaped section of the bracket, an elongated brace member having one end attached to the bicycle support member at a location spaced from the pivot means and the other end disposed between said second and third flange portions, and mounted on said pivot means for pivotal movement with the bicycle support member, the web portion of the U-shaped section of the bracket being arranged to engage the bicycle support member when it is in its raised position to stop pivotal movement of the bicycle support in one direction.

11. A foldable bicycle rack comprising an elongated upwardly opening channel member adapted to receive the wheels of a bicycle, a support base, a onepiece mounting bracket including first and second plate sections disposed coplanar with each other and having adjacent edges spaced apart and an intermediate downwardly opening U-shaped section having an upper web portion and first and second depending flange portions integrally joined along their lower edges to the adjacent edges of the respective first and second plate sections, means attaching the channel member to the support base with the length of the channel member extending generally parallel to the flange portions of the U-shaped section of the bracket, first and second fastener means respectively attaching the first and second plate sections to the support base, an elongated bicycle support member having one end disposed between the first and second flange portions of the U-shaped section of the bracket, pivot means extending through the first and second flange portion of the U-shaped section of the bracket and through said one end of the elongated bicycle support member for pivotally supporting the latter for movement between a folded position extending alongside the channel member and a raised position in which the other end of the bicycle support member is spaced above the channel member, a latch member engaging the bracket at a location spaced horizontally from said pivot means and engageable with said bicycle support member at a location spaced above said pivot means when the support member is in a raised position for releasably retaining the support member in its raised position, and means on the other end of the bicycle support member for engaging a portion of the frame of a bicycle to support a bicycle in the longitudinal medial plane of the channel member.

* * * * *